March 28, 1933. R. B. BENJAMIN 1,903,086
SHOCK ABSORBING SOCKET
Filed Oct. 19, 1929   2 Sheets-Sheet 1
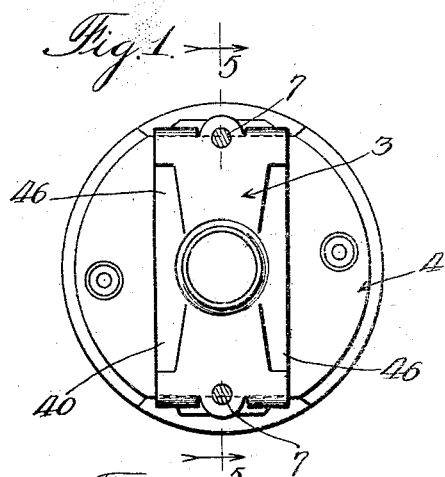
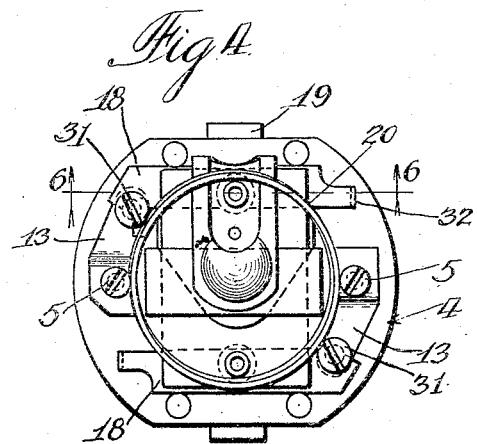
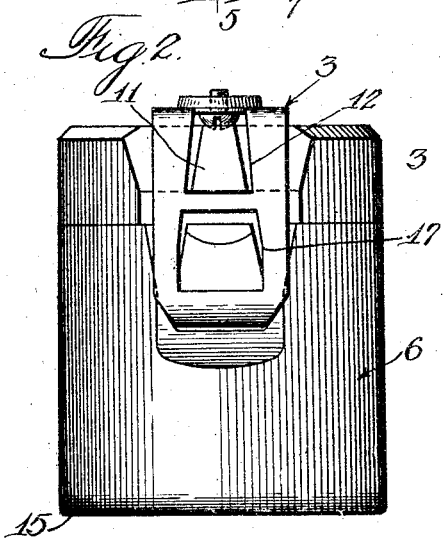
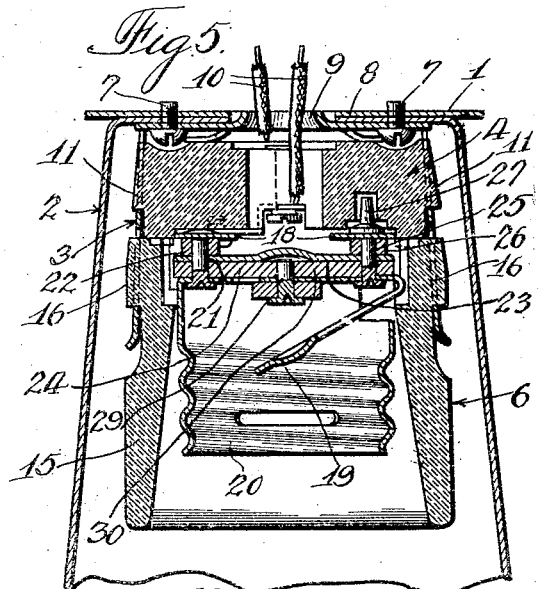
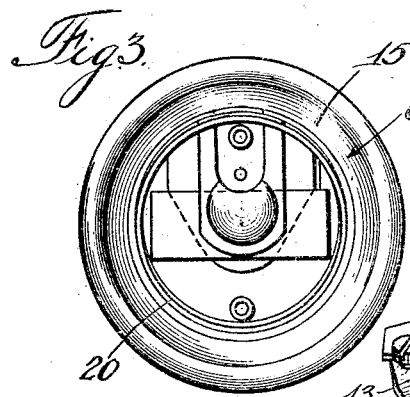
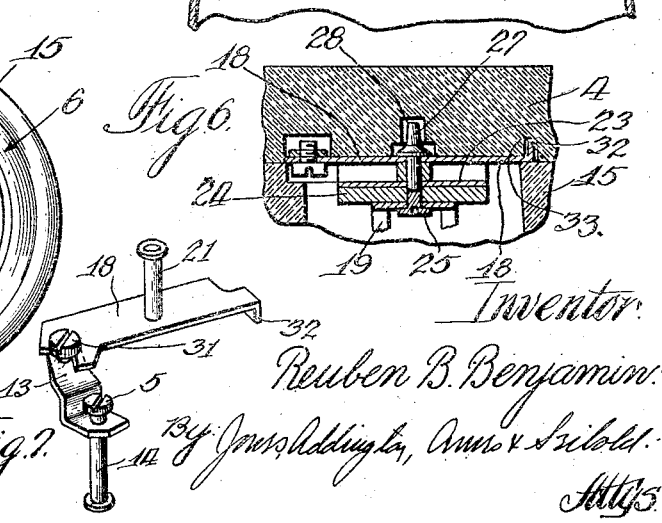
Inventor
Reuben B. Benjamin.

March 28, 1933.  R. B. BENJAMIN  1,903,086
SHOCK ABSORBING SOCKET
Filed Oct. 19, 1929   2 Sheets-Sheet 2
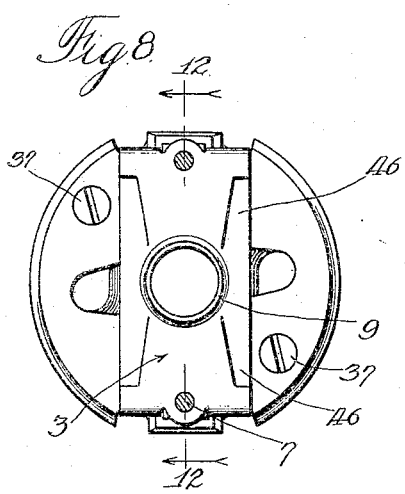
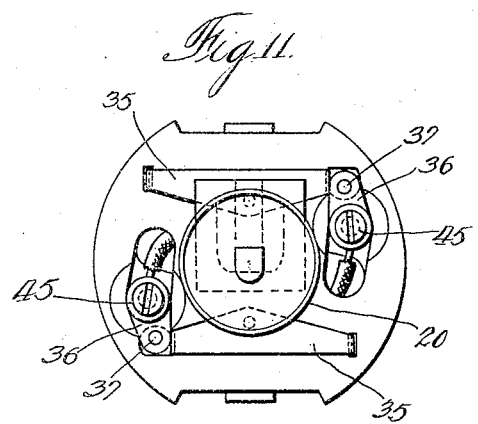
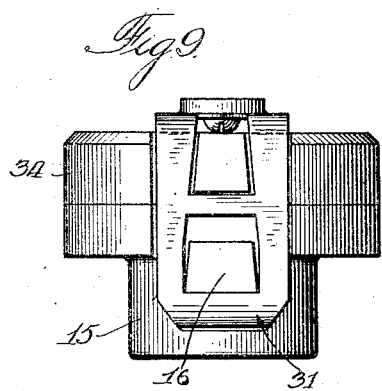
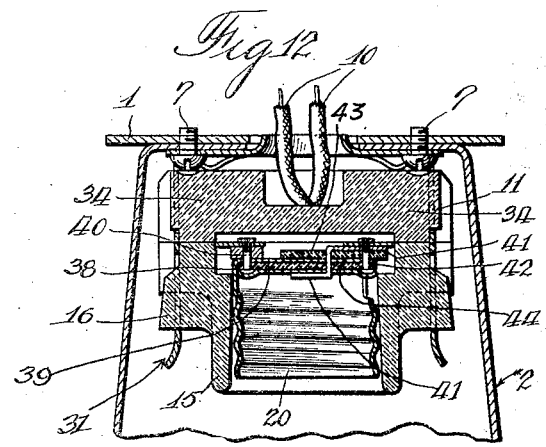
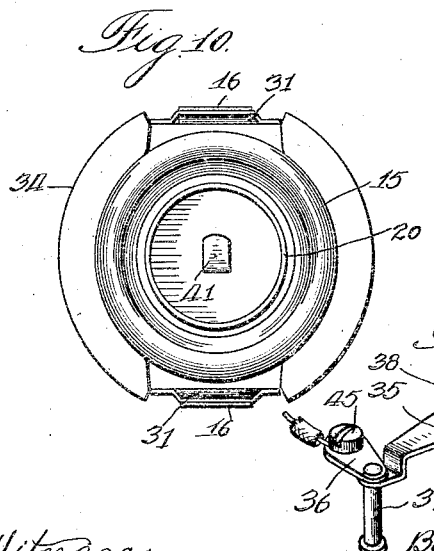
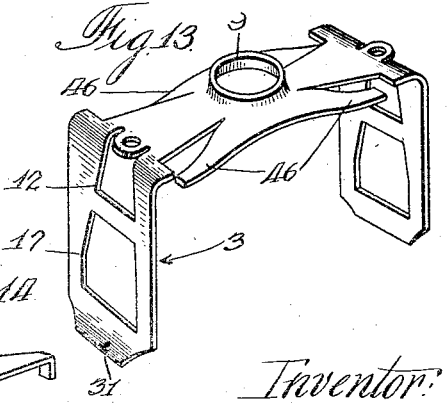
Inventor:
Reuben B. Benjamin
By Jones, Addington, Ames & Seibold
Attys.
Witness:
David S. Magnuson Patented Mar. 28, 1933

1,903,086

UNITED STATES PATENT OFFICE

REUBEN B. BENJAMIN, OF CHICAGO, ILLINOIS, ASSIGNOR TO BENJAMIN ELECTRIC MFG. CO., OF DES PLAINES, ILLINOIS, A CORPORATION OF ILLINOIS

SHOCK ABSORBING SOCKET

Application filed October 19, 1929. Serial No. 400,811.

One of the objects of my invention is to provide an improved shock absorbing socket construction for a ceiling fixture which will be easy to wire and assemble, simple, efficient, durable and cheap.

Further objects will appear from the description and claims.

In the drawings, in which an embodiment of my invention is shown—

Figure 1 is a top plan view of socket and holder;

Fig. 2 is a side elevation of Fig. 1;

Fig. 3 is a bottom view of the socket;

Fig. 4 is a bottom view of the socket with the insulating shell or housing removed;

Fig. 5 is an axial section on the line 5—5 of Fig. 1;

Fig. 6 is a section on the line 6—6 of Fig. 4;

Fig. 7 is a perspective view showing the connection between the spring and binding plate;

Fig. 8 is a top plan view of another form of my invention;

Fig. 9 is a side elevation of Fig. 8;

Fig. 10 is a bottom plan view of Fig. 8;

Fig. 11 is a bottom plan view with the outer shell or casing removed;

Fig. 12 is a section on the line 12—12 of Fig. 11;

Fig. 13 is a perspective view of the metal clip or holder for the socket construction; and Fig. 14 is a perspective view showing the connection between the spring and binding plate.

Referring to the drawings in detail and first to Figs. 1 to 7, inclusive, the construction here shown comprises a sheet metal plate, which may be an outlet box cover or the like, a sheet metal shade or shade supporting member 2, a sheet metal socket supporting member 3 (Fig. 13), an insulating wiring base 4 held in place by the supporting member 3, wiring terminals 5 mounted thereon and a receptacle portion 6 also detachably supported by the sheet metal supporting member 3 and held in electrical connection with the wiring terminals 5 on the wiring base 4.

The spring clip supporting member 3 and the shade-supporting member 2 may be held in place on the cover 1 by means of screws 7 extending through the supporting member 3 and the flange 8 of the shade-supporting member 2 and threaded into the box cover 1. The spring clip 3 is provided with a central opening 9 for the passage of the feed wires 10. The wiring base 4 is held in the spring clip 3 by means of integral lugs 11 which extend into openings 12 in the spring clip 3, the spring clip 3 yielding to permit the lugs 11 to be snapped into place.

The binding plates 13 may be held on the wiring base 4 by means of tubular rivets 14 internally threaded to receive the binding screws 5. The insulating shell or housing 15 is detachably held by the spring clip 3 by means of the integral lugs 16 which extend into openings 17 in the spring clip 3, the spring clip 3 yielding to permit the lugs 16 to be snapped into place. The socket interior is yieldingly supported from the wiring base 4 by means of a pair of leaf-spring members 18. These leaf-springs 18 form part of the circuit, one of them being electrically connected with the center contact 19 and the other with the shell contact 20. The spring which is connected with the shell contact 20 is secured to the socket interior by means of a rivet 21 extending through the leaf spring 18 through a metal washer 22, an insulating disc 23, an insulating button 24, and finally through the flange of the threaded shell contact 20. The leaf spring 18 which is electrically connected with the center contact 19 is secured to the socket interior construction by means of a rivet 25 extending through the leaf spring 18, thence through a metal washer 26, the insulating disc 23, the insulating button 24, and finally through the sheet metal stamping, forming the center contact 19. In order to secure polarity, the rivet 25 is provided with an upward extension 27 which engages in a recess 28 in the wiring base 4. The center contact member 19 is further secured in proper relation in the socket construction by means of a central rivet 29 extending through the button 24, center contact stamping 19 and washer 30.

One end of each of the leaf springs 18 is provided with a sort of bayonet-joint formation for connection with a screw 31 threaded into the binding plate 13. For this purpose, the end of the leaf spring is notched out to receive the shank of the securing screw so that the leaf spring 18 may be connected with the binding plate 13 by a lateral motion of the leaf spring 18 with respect to the screw 31 to bring the edges of the notch underneath the head of the screw 31 so that by tightening up the screw 31 the leaf spring is clamped between the head of the screw 31 and the binding plate 13.

The other end of the leaf spring 18 is held against the insulating wiring base 4 by means of the upper edge of the insulating shell 15, this end of the leaf spring 18 being clamped between the shell 15 and the wiring base 4. In order to position the leaf spring 18 with respect to the wiring base 4, it is provided with an upturned lug 32 which fits into a corresponding recess 33 in the wiring base 4 (Fig. 6).

The circuit is from the feed wire 10 connected with the binding plate 13, leaf spring 18, rivet 25, center contact 19, lamp filament, shell contact 20, rivet 21, leaf spring 18, and binding plate 13 to the other feed wire 10.

In assembly, the spring clip 3 and shade-supporting device 2 are first secured in position by means of the two screws 7. The wiring base 4 is then snapped into place and wired. The receptacle sub-assembly, exclusive of the insulating shell 15, is then secured in place by a bayonet-joint operation to connect the leaf spring 18 with the binding plates 13 by means of the screws 31. The assembly is then completed by snapping the insulating shell or housing 15 into place.

The construction shown in Figs. 8 to 14 is similar to that just described except as to the socket interior and the method of spring support and wiring. In this form, the socket interior is permanently secured to the wiring base 34 through the leaf spring 35 members which are riveted both to the wiring base 34 and to the receptacle interior. In this form the binding plate 36 and one end of the leaf spring 35 are both permanently secured to the wiring base 34 by means of a screw 37. The leaf spring 35 which is electrically connected with the shell contact 20 is secured to the socket interior construction by means of a rivet 38 extending through a button 39, thence through the flange on the shell contact 20, the metal washer 40 and finally through the leaf spring member 35.

The leaf spring member 35 which is electrically connected with the center contact 41 is secured to the socket interior construction by means of a rivet 42 extending through the insulating button 39, insulating disc 43, center contact, stamping 41 and finally through the leaf spring member 35. The center contact stamping 41 extends through this insulating disc 43, thence through the insulating button 39 and through an inner insulating sheet 44 which covers the heads of the securing rivets 38 and 42.

The circuit is from the feed wire 10 to the binding plate 36, through the leaf spring 35, center contact 41, lamp filament, shell contact 20, rivet 38 or washer 40, leaf spring 35, and binding plate 36 to the other feed wire 10.

In assembly, after the shade-supporting member 2 and spring clip 3 are in position, the feed wires 10 are connected to the binding screws 45 and the wiring base 34 carrying the socket interior is snapped into place into the spring clip 3. In both this form and the form previously described, the spring clip 3 is provided with spring tongues 46 which exert a downward pressure on the wiring base to prevent the lugs 11 shifting around in the openings 12 in the spring clip 3 by exerting a downward yielding pressure on the upper face of the wiring base.

After the wiring base with the socket interior is in place the assembly is completed by snapping the outer shell or casing 15 into place in the spring clip 3.

I claim:

1. A shock absorbing socket construction comprising a supporting plate, a shade-supporting and socket housing member having a flange lying against said supporting plate, a spring socket-supporting yoke having a portion lying against said flange, fastening means for securing said yoke portion and said flange to said supporting plate, an insulating binding plate and contact supporting member detachably mounted on said yoke, a binding plate mounted on said supporting member, a leaf-spring having one end secured to said binding plate, a lamp-engaging contact electrically and mechanically connected with said leaf spring, and a lamp contact housing member of insulating material detachably connected with said yoke and lying inside said shade-supporting and socket housing member.

2. An electrical receptacle construction comprising a spring socket-supporting yoke having spring arms for embracing a socket therebetween, an insulating supporting member detachably secured between the upper portions of the spring arms of the yoke, a wiring terminal and contact mounted thereon, and an insulating housing member surrounding said contact, and covering said wiring terminal and detachably mounted between the lower ends of said spring arms.

3. An electrical receptacle construction comprising a spring socket-supporting yoke having spring arms for embracing a socket therebetween, an insulating supporting member detachably secured between the upper portions of the spring arms of the yoke, a wiring terminal and contact mounted thereon, and an insulating housing member surrounding said contact and covering said wiring terminal and detachably mounted between the lower ends of said spring arms, and a shade-supporting and socket-housing member having a flange lying against said yoke.

4. A shock absorbing socket construction comprising an insulating member for supporting a binding plate and contact, a binding plate mounted thereon, a leaf-spring conductor having one end secured to said binding plate, and a lamp-engaging contact electrically and mechanically connected with said leaf spring.

5. A shock absorbing socket construction comprising an insulating member for supporting a binding plate and contact, a binding plate mounted thereon, a leaf-spring conductor having one end secured to said binding plate, and a lamp-engaging contact electrically and mechanically connected with said leaf spring, and a contact-housing member of insulating material surrounding said contact.

6. A shock absorbing socket construction comprising an insulating member for supporting a binding plate and contact, a binding plate mounted thereon, a leaf-spring conductor having one end secured to said binding plate, a lamp-engaging contact electrically and mechanically connected with said leaf spring, and a lamp contact housing member of insulating material surrounding said contact, the other end of said leaf spring being held between said supporting member and said contact-housing member.

7. A shock absorbing socket construction comprising a wiring base, a binding plate mounted thereon, a screw threaded therein, a receptacle member, and means for yieldingly supporting said receptacle member with respect to said binding plate comprising a leaf-spring member having a notch to receive the shank of said screw whereby the spring may be secured to the binding plate by lateral movement to bring a portion of the spring in position to be clamped between the head of the screw and the binding plate.

8. An electrical receptacle construction comprising a spring socket supporting yoke having spring arms for embracing a socket therebetween, an insulating supporting member detachably secured between the upper portions of the spring arms of the yoke, a wiring terminal mounted on said insulating member, a receptable contact, and an insulating housing member surrounding said contact and covering said wiring terminal and detachably mounted between the lower end of said spring arms.

9. An electrical receptacle construction comprising a spring socket supporting yoke having spring arms for embracing a socket therebetween, an insulating supporting member detachably secured between the upper portions of the spring arms of the yoke, a wiring terminal mounted on said insulating member, a shell receptacle contact, spring means for supporting said shell contact on said insulating member, and an insulating housing member surrounding said shell contact and covering said wiring terminal and detachably mounted between the lower ends of said spring arms.

In witness whereof, I have hereunto subscribed my name.

REUBEN B. BENJAMIN.